Aug. 7, 1934.   C. G. HAWLEY   1,969,371
FUEL BURNER
Filed March 11, 1931    3 Sheets-Sheet 3

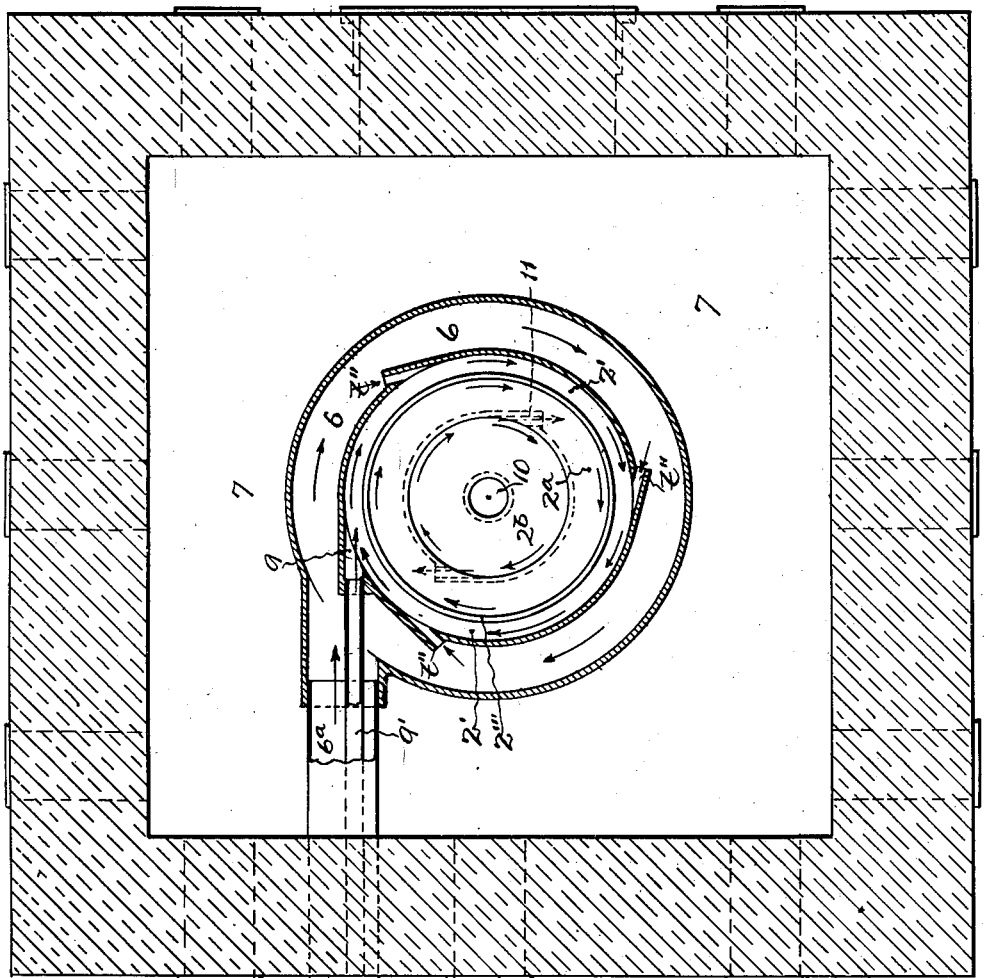
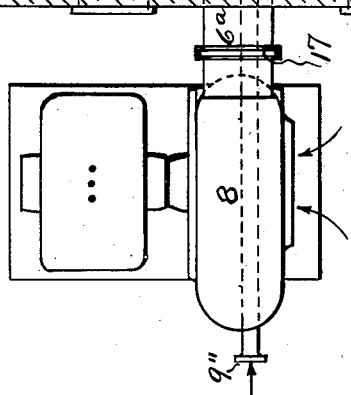
Fig. 2

INVENTOR
Charles G. Hawley.
BY Mason + Mason
ATTORNEYS

Patented Aug. 7, 1934

1,969,371

UNITED STATES PATENT OFFICE 1,969,371

FUEL BURNER

Charles Gilbert Hawley, Chicago, Ill.

Application March 11, 1931, Serial No. 521,871

7 Claims. (Cl. 110—22)

This invention relates to improvements in fuel burners or furnaces and is employed with fuels and fuel mixtures of all sorts, including combustible gases, oils, greases, pulverulent coals and other burnable solids.

The object of the invention is to provide a fuel burner adapted for use with such fuels and fuel mixtures and which shall be of small compass, high efficiency, low cost and great durability.

Another object is to provide a fuel burner of a bowl-like centrifugal type directly within which the combustion of the fuel is both initiated and chiefly accomplished and which may be best constructed wholly of metal, without resort to fire clay or like refractories for its combustion surfaces; and which shall defeat and overcome the difficulties hitherto occasioned by the fusion of the fuel ashes and the formation of molten slags.

A special object of the invention is to provide a burner capable of overcoming such difficulties and which shall discharge all solid residues of combustion in the form of sintered ashes, preventing the formation of molten slags that are likely to cause stoppages.

Another special object of the invention is to provide a burner that shall be adapted to accomplish the final desiccation of partially dehydrated fuel substances, particularly including sewage sludges and the like, to the end that such substances may be economically disposed of or destroyed in the manner described and claimed in my companion applications S. N. 448,122 filed April 28, 1930 and S. N. 595,868 filed February 29, 1932.

Another object of the invention is to provide a fuel burner which, if need be, may be operated without a housing of any sort and which, correlatively, may be used in fire or furnace chambers of all kinds.

Still further objects of the invention will appear hereinafter.

The invention resides in a fuel burner having notable characteristics which enable the accomplishment of the foregoing objects, comprising various novel features and combinations of parts which will be explained in detail. All will be readily understood upon reference to the drawings which accompany this specification.

Figure 1:
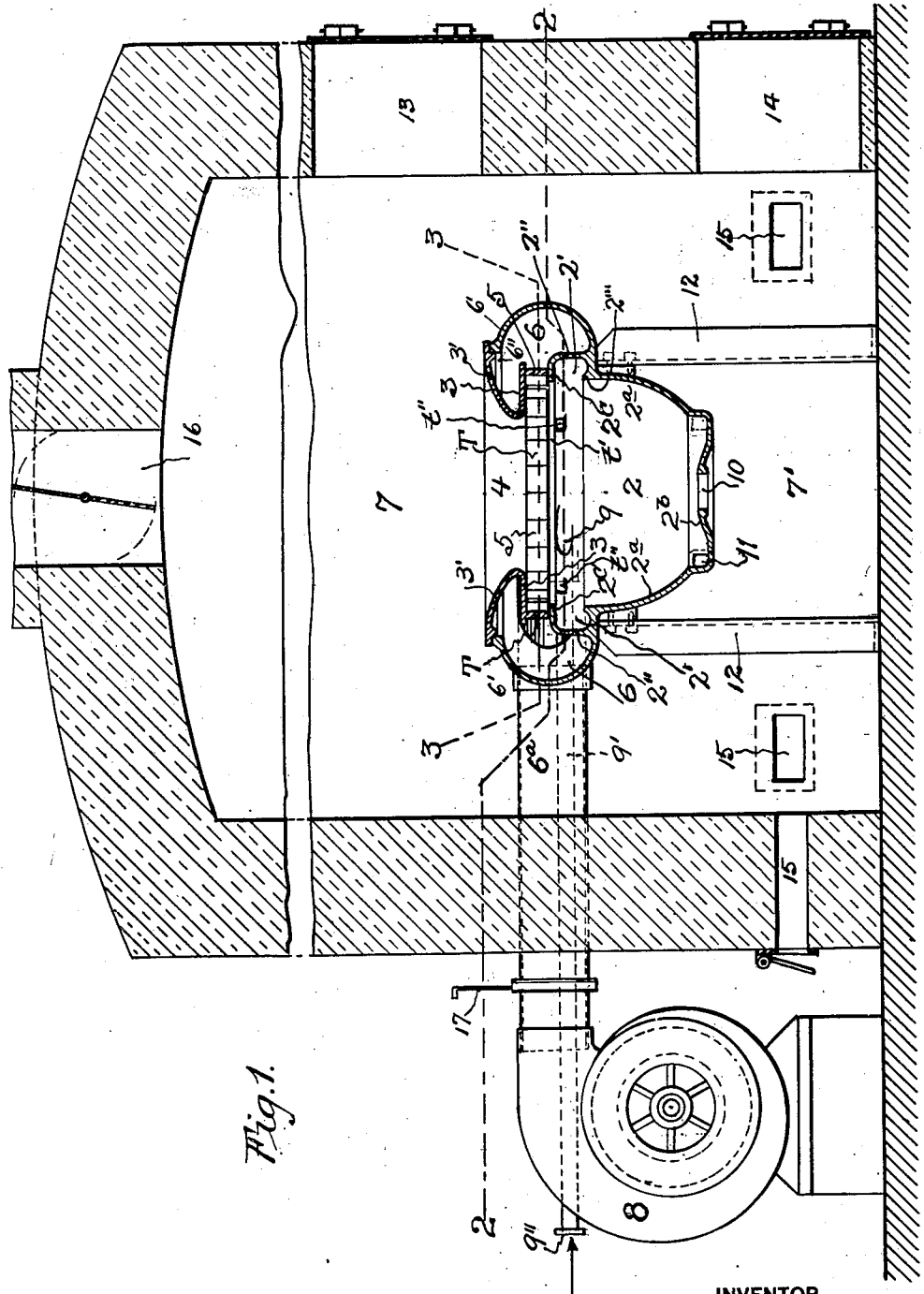
Figure 6:
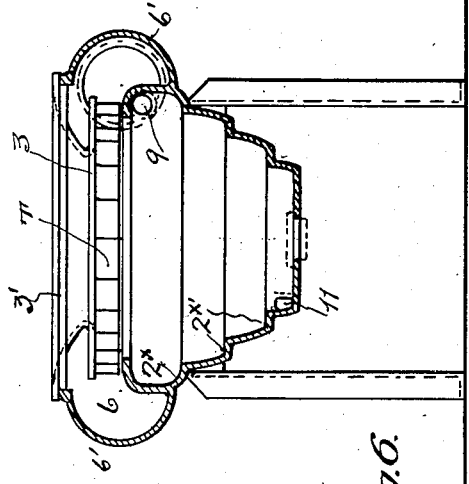
Figure 5:
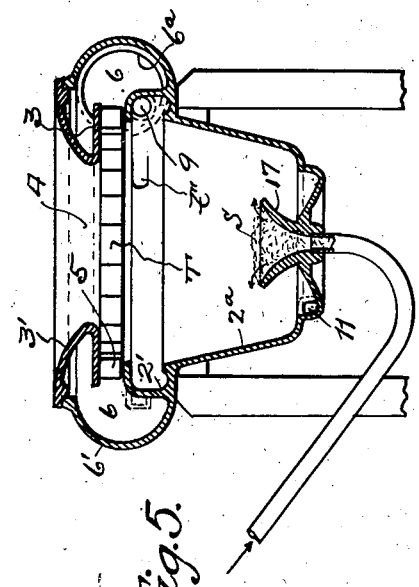
Figure 3:
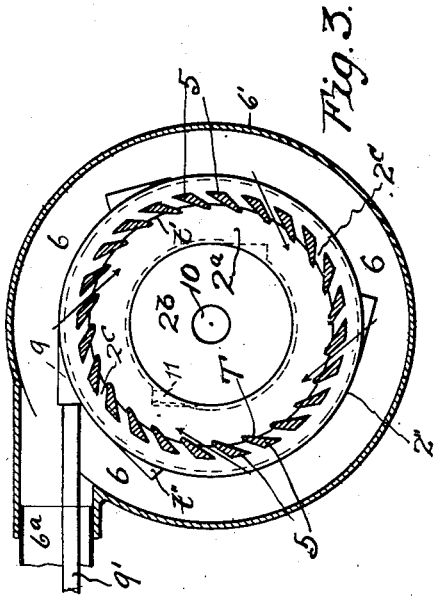
Figure 4:
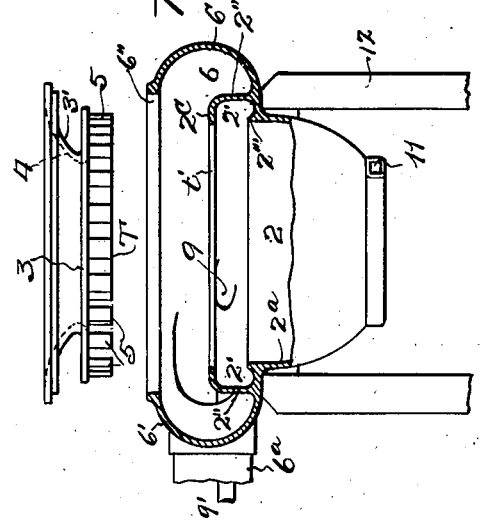

Fig. 1 of said drawings is a vertical section of an exemplary fuel burner embodying this invention, typically situated within a furnace chamber or oven;—Fig. 2 is a horizontal section, substantially on the irregular line 2—2 of Fig. 1;—Fig. 3 is a horizontal section upon the line 3—3 of Fig. 1;—Fig. 4 is a view illustrating the unitary bowl portion of the burner and showing the tuyère portion thereof as it appears when separated from the bowl portion;—Fig. 5 illustrates a modified form of the invention and other means for introducing and drying various substances, for later combustion within the burner;, and, Fig. 6 illustrates another modified form of this novel centrifugal burner.

The invention is characterized by a bowl-like burner or combustion chamber 2 comprising a thin walled metal casting. The bowl is either wholly or partially closed at the bottom but has in its cast metal top 3 a large central flame discharge orifice 4. Directly beneath that orifice but of larger diameter and preferably integral with the ring-like part 3 is an air entrance tuyère T comprising a circumferential series of angularly positioned or tangential air directing blades 5. The tuyère is supplied with air from the enclosing chamber 6, which receives the air from a duct $6a$ leading across the furnace chamber 7. In most cases a motor driven fan or blower 8 will be used to propel the air into the chamber 6 and hence into the bowl, through the tuyère T. The purpose of this many ported tuyère is to cause the combustion-supporting air to whirl uniformly within said bowl, beneath said top 3.

The fuel is separately introduced into a deep groove or circumferential retention space 2' which encircles the top of the bowl portion, directly beneath the tuyère T. A wall 2'' separates the groove from the air preheating space 6; and the rim $2c$ of the bowl portion contains a central opening $t'$ concentric with but preferably of slightly greater internal diameter than the bladed tuyère T. The fuel enters the groove 2' through a tangential opening 9 beneath the overhanging rim $2c$; the fuel being supplied through a pipe or duct 9' that extends through and is protected by the tangential air duct $6a$. A feeder (not shown) appropriate to the fuel to be burned is attached to the outer end 9'' of the pipe 9' and serves to admit or force fuel into the groove at a predetermined uniform rate.

The whirling action of the entering air performs the function of forcibly distributing the fuel circumferentially within said groove and bowl and has the further effect of enforcing intimacy of contact between the air and the combustibles.

As the orifice 4 is of less diameter than the tuyère T and bowl 2, the whirling motion of the mixture takes place within said groove 2' and thence downward against the inner surface 2a of the bowl. Upon reaching the bottom 2b of the bowl, the gaseous products of combustion react and whirl upward toward and outward through said orifice 4.

The whirling of the gases within the bowl induces a characteristic reduction of pressure above the bottom 2b and a central opening 10 being provided in said bottom, a further supply of air will be drawn into the bowl from the ash pit portion 7' of the enclosing furnace or oven 7.

If desired, supplementary tangential air tuyères t'' or passages may enter the groove 2' from the chamber 6. During operation the pressure of air within the space 6 is always greater than in the bowl and the air flowing through such supplementary tuyères aids in whirling and distributing the fuel in the groove and bowl.

Where a liquid fuel is to be burned it is preferred that the groove 2' shall be provided with an upstanding rib or lip 2''', forming a liquid retaining gutter at the bottom of said groove. Such a gutter is an aid, particularly in the starting of the fire in the burner.

When ash containing fuels are to be burned the bottom of the bowl is provided with one or more prerferably tangential ash discharge openings 11.

As clearly indicated by the drawings it is preferred that the outer wall 6' of the air chamber 6 shall be integral with the wall 2'' and shall rise above the level of the tuyère T. It there presents a large opening 6'' in its rim. Similarly it is preferred that the burner top 3 shall be provided with an integral flaring portion 3' which shall rest upon the rim of the portion 6', occupying the opening 6'' and completing the enclosure of the chamber 6.

As well shown in Fig. 4 the entire top member, comprising the parts 3, 5 and 3', and containing the orifice 4, may be removed from the top of the bowl portion; thus affording free access to the interiors of the air chamber, the fuel groove and the bowl.

The assembled burner is suitably supported within the furnace chamber 7, as by means of the legs or columns 12.

The furnace has suitable access and clean-out doors 13 and 14 and by preference its lower walls contain damper controlled secondary air admission openings 15. The products of combustion, after imparting their heat to any suitable heat absorber (not shown) leave the furnace chamber through a suitably dampered outlet 16.

As herein depicted a generous space remains between the burner and enclosing walls of the furnace chamber, to the end that fly-ash, if blown from the top of the burner, may settle into the ash pit 7'. For reasons presently to be explained, it will be desirable in some cases to limit communication between the spaces 7 and 7' and thus "shade" or partially enclose the top of the ash pit and prevent the development of excessive temperatures therein.

The operation of this burner is carried out substantially as follows: Kindling wood, oily waste or the like being placed in the bowl and ignited and the outlet 16 being open, the air blower 8 is started to furnish air for the proper burning of such starting fire: The supply of air is restricted for a time, as by means of a slide or gate 17 operating in the outer part of the blast duct 6a. Vigorous combustion ensues; and within a short time the temperature of the metal burner becomes sufficient to volatilize or vaporize ordinary fuels that may be supplied through the groove entrance opening 9. Gaseous fuels may be admitted more promptly; liquid fuels should be withheld until the burner is hot; and solid fuels, unless dry and finely pulverized, should be withheld until the burner has been raised nearly to a red heat.

It will be apparent that combustible gas properly measured into the mixing groove 2' will be intimately mixed with a proportionate volume of whirling air from the tuyère T, governed by the slide 17. Being ignited from the starting fire, the mixture burns quietly and developing a flame of great intensity within the burner, is consumed most efficiently and completely.

Oil fuels behave much the same as gas, for the oil which reaches the groove 2' is therein immediately and efficiently vaporized and mixed with air at high temperature.

Solid fuels, such as crushed and powdered coal, upon being distributed in the groove 2' are centrifugally retained therein until quite completely decomposed; and in admixture with proportionate air, thereafter whirl and burn quite as do the more volatile liquid fuels.

High temperatures are developed; but the bowl is effectively preserved by the free and constant radiation of heat into the ash pit. This is a benefit directly attributable to the use of the metal bowl. A further important benefit follows this radiation of heat through the relatively thin metal walls; to-wit; the inner surface 2a is thereby kept below the temperature of molten ash and any fluid ash which is deposited thereon is chilled. Solidifying and whirling agains that surface the slag is converted into particles or pellets which presently are discharged with other ashes through the tangential eject openings 11 at the bottom of the burner.

The temperature in the ash pit 7' is chiefly occasioned by the heat radiated from the lower part of the burner. The top of the ash space 7' opens into the fire chamber 7, yet it is rare that the temperature of the air and gases surrounding the bowl becomes excessive with respect to the safe working temperature of the bowl casting. Nevertheless the dampers of the air ducts 15 are to be regulated with that limit in view; and when solid fuels are being burned, also for the purpose of keeping the burner cool enough to prevent collections of molten slags which might clog the ash discharging holes 11.

The metal bowl becomes red hot, yet its inner surface 2a will be kept well below the temperature at which fuel slags can exist in a molten state. In consequence, the ash which results from the combustion of solids within the bowl is discharged therefrom in a merely burned or sintered state and not in the form of molten slag. It thus becomes possible to keep the ash eject hole or holes 11 open indefinitely.

Very high temperatures are developed as a result of the substantially perfect mixing of the air and combustibles and because of the confinement of the initial combustion within the relatively restricted bowl. In consequence the temperature of the bowl is kept at a high point and it therefore becomes possible to admit to this burner fuels which contain large proportions of moisture. The moisture is almost instantly evaporated while within the groove and the vapor being expelled therefrom is discharged downward and inward toward the axis of the bowl finding escape with the flames passing through the outlet or orifice 4. It is this which fits the burner for use with fuels which are mixed with watery sludges and the like as described in my said companion applications.

Combustion initiates in the groove 2' and the fuel is distributed and held therein by the whirling propulsion of the entering air and until the fuel is well prepared for further combustion at lower levels within said bowl. Combustion is not necessarily completed within the bowl; as evidenced by the fact that flames whirl from the orifice of the burner with an activity which serves to distribute the radiant effects thereof throughout the fire chamber served by the burner.

Convenience is to be observed in the manufacture and maintenance of these simplified burners. Some may be partly formed of a more highly refractory material; and burners of the larger sizes may comprise a greater number of separable parts than here shown. However, it is believed the two-part cast metal burners here preferred, will be found acceptable and adequate in virtually all cases.

Very moist sludges and the like need not be introduced through the mixing groove 2' but may be fed into the bottom of the burner as shown in Fig. 5. The sludge is pumped or driven upward within a flaring cup or cone 17, wherein the moisture is evaporated by the heat within the burner. Most advantageously, the resulting vapor is delivered directly within the central portion of the vortex of burning gases within the burner; and therefore the vapors incident to the drying of the sludge take a direct course upward, through the orifice 4. Thus such vapors are kept from the hot surfaces 2a; which latter are reserved for the combustion of the fuels. As fast as the top surface, S, of sludge becomes dry, the dried solids are expelled from the cup centrifugally and in the main are thus thrown against the surface 2a, there to burn, as would any other comminuted fuel.

The structure illustrated in Fig. 6, by way of example, discloses a higher and more capacious fuel retention groove 2x but is chiefly distinguished by a plurality of fuel restraining shoulders 2x' in and upon the upright wall of the burner bowl. Such circumferential shoulders are sometimes beneficial in the burning of difficult and wet fuels, which do not volatilize or decompose promptly, and should be centrifugally held in the burner for more extended periods.

As various modifications hereof will readily suggest themselves to those who are skilled in the art, this invention is not limited or restricted to the burners and methods herein disclosed. As better defining the scope of the invention, attention is directed to the following claims.

1. A fuel burner of the centrifugal type, comprising a deep bowl portion having in its upper part an internal circumferential fuel and air mixing groove, in combination with a whirl promoting tuyère surmounting said groove and bowl and containing a central flame orifice, an air preheating chamber circumferentially surrounding and opening into said tuyère, and means for feeding fuel into said groove.

2. A fuel burner of the centrifugal type, comprising a deep bowl portion having in its upper part an internal circumferential fuel and air mixing groove, in combination with a whirl promoting tuyère surmounting said groove and bowl and containing a central flame orifice, an air preheating chamber circumferentially surrounding and opening into said tuyère, means for feeding fuel into said groove, and the relatively depressed bottom of said bowl containing an ash eject opening leading from the interior thereof.

3. A fuel burner of the centrifugal type, comprising a deep bowl portion having an internal circumferential fuel and air mixing groove in its top and having a central hole in its relatively depressed bottom, in combination with a whirl promoting tuyère surmounting said groove and containing a central flame orifice, an air preheating chamber circumferentially surrounding the top of said bowl portion and opening into said tuyère, and means for feeding fuel into said groove.

4. A fuel burner of the centrifugal type, comprising a deep bowl portion, in combination with a whirl promoting tuyère surmounting the same and containing a central flame orifice, an air preheating chamber circumferentially surrounding and opening into said tuyère, means for feeding air to said chamber, and means for feeding fuel into both the upper part of said bowl directly beneath said tuyère and also into the relatively depressed bottom of said bowl portion.

5. A fuel burner of the centrifugal type, comprising a deep cast metal bowl portion having in its upper part an internal circumferential air and fuel mixing groove, in combination with a cast metal whirl promoting tuyère surmounting said groove and containing a central flame orifice, an air preheating chamber surrounding and opening into said tuyère and formed by a cast metal annulus which is jointed to said tuyère, means for feeding fuel into said groove, and means for discharging ash from the periphery of the relatively depressed bottom portion of the bowl.

6. A fuel burner of the centrifugal type, comprising a deep cast metal bowl portion having an internal circumferential air and fuel mixing groove in its upper part and having an ash eject hole in its relatively depressed bottom, in combination with a cast metal whirl promoting tuyère portion surmounting said groove, forming the top of said bowl portion and containing a central flame orifice, a cast metal air preheating chamber surrounding the upper part of said bowl portion jointed to said tuyère and opening into said tuyère portion, and means for feeding fuel into said groove directly beneath said tuyère.

7. A fuel burner of the centrifugal type, comprising a deep bowl portion characterized by an internal circumferential mixing groove in its upper part and having a tangential ash eject hole in its relatively depressed bottom, in combination with a whirl promoting tuyère surmounting said groove and containing a central flame orifice, an air preheating chamber surrounding the top of said bowl portion and communicating with said tuyère, an air duct joining said chamber, and a fuel duct leading through said air duct and joining said groove beneath said tuyère.

CHARLES GILBERT HAWLEY.